July 31, 1928.
J. R. MARSHALL
HOOK
Filed Jan. 18, 1928
1,678,993
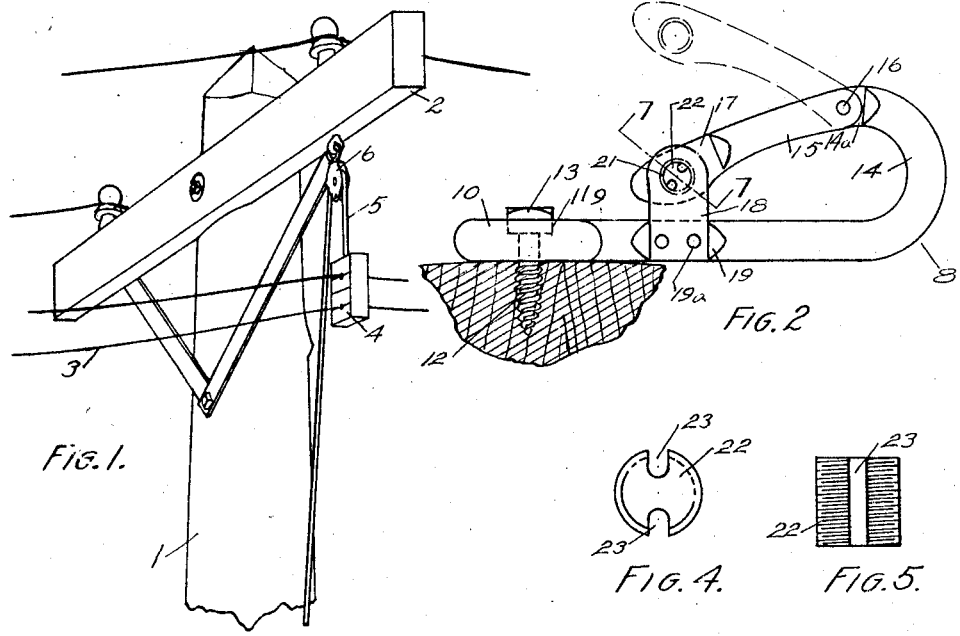
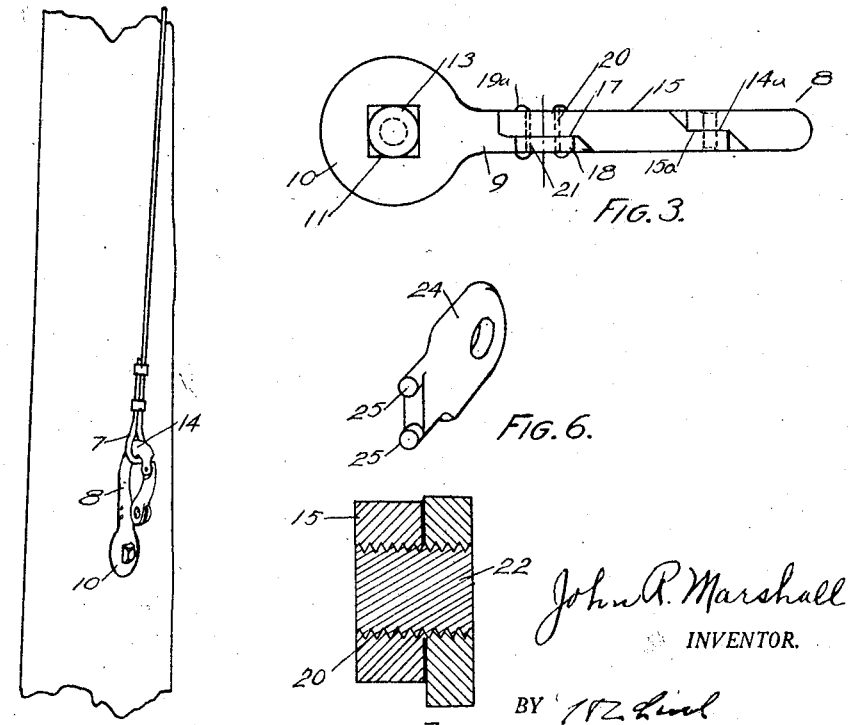
John R. Marshall
INVENTOR.
BY
ATTORNEYS.

Patented July 31, 1928.

1,678,993

UNITED STATES PATENT OFFICE.

JOHN R. MARSHALL, OF McKEAN, PENNSYLVANIA.

HOOK.

Application filed January 18, 1928. Serial No. 247,689.

Hooks are desirable in very many situations, particularly in anchoring cables and where it is desirable to prevent the opening of the hook except by those engaged in operating the apparatus. As exemplified the invention is particularly used as an anchor hook for a cable carrying an insulator for electric lines and as such is so locked as to prevent the mischievous tampering with the support. Features and details of the invention will appear from the specification and claims.

A preferred embodiment of the invention is illustrated in the accompanying drawings as follows:—

Fig. 1 shows a perspective view of a line post with the hook in place thereon.

Fig. 2 a side elevation of the hook.

Fig. 3 a front elevation of the hook.

Fig. 4 an end view of a securing screw for the closure means on the hook.

Fig. 5 a side elevation of the screw.

Fig. 6 a perspective view of a wrench operating the screw.

Fig. 7 a section on the line 7—7 in Fig. 2.

1 marks a line post, 2 a cross bar thereon, 3 line wires, 4 an insulator carried by the line wires, 5 a cable on which the insulator is suspended, 6 a pulley carried by the cross bar over which the cable 5 extends, 7 an eye in the end of the cable, and 8 the anchor hook.

The anchor hook has a shank 9 in the end of which is an eye 10. The opening of the eye is provided with an out-of-round socket, as shown, a square socket adapted to receive the head 13 of a screw 12 extending through the eye by means of which the hook is secured to the post. As this screw head enters the socket the screw is set up, the last turn being made by swinging the hook. The screw is thereby locked without turning the hook and the hook is locked against turning by the cable. Thus the hook is made secure against easy removal.

A hook end 14 extends from the shank 9. A closure bar 15 is pivotally mounted by means of a pin 16 on the hook end 14. The hook end is cut away at 14ª and the bar is cut away at 15ª so that when the bar is in closed position the hook end and bar present no obstruction. This is of importance in some uses of the device where, for instance, a cable is drawn through the hook and such absence of obstruction prevents fouling.

The end of the bar 15 is flattened out at 17 and in closed position is beside the post 18, the post being secured in a notch 19 by pins 19ª. This notch is of a depth to make the surface of the post flush with the surface of the shank and the cross bar closed on the post is with the post substantially the same width as the shank as clearly shown in Fig. 3.

The closure bar has a screw-threaded opening 20 near its end which is adapted to be brought into register with the screw-threaded opening 21 in the post and a screw 22 extends through this opening locking the closure bar and post together. The screw has grooves 23 extending along each side of it into which projections 25 on a wrench 24 may be extended for inserting, or removing the screw. It is the intention to have the screw housed in the openings so that it is only with some special tool that the screw can be readily removed.

What I claim as new is:—

1. In a hook, the combination of a shank having a screw-threaded opening therein; a hook end on the shank; a bar pivoted on the hook end closing the hook, said bar having a screw-threaded opening adapted to be brought into register with the screw-threaded opening in the shank; and a screw connection between the shank and the bar.

2. In a hook, the combination of a shank having a screw-threaded opening therein; a hook end on the shank; a bar pivoted on the hook end closing the hook, said bar having a screw-threaded opening adapted to be brought into register with the screw-threaded opening in the shank; and a screw connection between the shank and the bar comprising a screw housed in the opening.

3. In a hook, the combination of a shank having a screw-threaded opening therein; a hook end on the shank; a bar pivoted on the hook end closing the hook, said bar having a screw-threaded opening adapted to be brought into register with the screw-threaded opening in the shank; a screw connection between the shank and the bar comprising a screw housed in the opening; and means in the screw forming a wrench hold.

4. In a hook, the combination of a shank having a screw-threaded opening therein; a hook end on the shank; a bar pivoted on the hook end closing the hook, said bar having a screw-threaded opening adapted to be brought into register with the screw-threaded opening in the shank; and a screw connection between the shank and the bar comprising a screw housed in the opening and opposing grooves extending along the screw forming a wrench hold.

5. In a hook, the combination of a shank having a screw-threaded opening therein; a hook end on the shank; a closure bar pivotally mounted on the hook end and closing the hook, said bar and hook end being cut away on adjacent faces forming a joint without obstructions with the bar in closed position, said bar having a screw-threaded opening adapted to be brought into register with the screw-threaded opening in the shank; and a screw connection between the shank and bar.

6. In a hook, the combination of a shank having a screw-threaded opening therein; a post arranged on the shank; a hook end on the shank; a pivoted bar pivotally connected with the hook end and extending to the post, said bar having a screw-threaded opening adapted to be brought into register with the screw-threaded opening in the shank; and a screw connection between the bar and post.

7. In a hook, the combination of a shank having a screw-threaded opening therein; a hook end on the shank; a post on the shank, said post being non-overhanging on the shank; a bar pivotally connected with the hook end, said bar and hook end being cut away forming an unobstructed connection; and a screw connection between the bar and post, said bar being cut away at the post forming an unobstructed connection between the post and bar, said bar having a screw-threaded opening adapted to be brought into register with the screw-threaded opening in the shank.

8. In a hook, the combination of a shank having an eye thereon with an out-of-round screw head receiving socket; a hook end on the shank; and means for closing and locking the hook.

In testimony whereof I have hereunto set my hand.

JOHN R. MARSHALL.